United States Patent
Smith, III et al.

(10) Patent No.: US 8,299,712 B2
(45) Date of Patent: Oct. 30, 2012

(54) LIGHT UNIT WITH INTERNAL POWER FAILURE DETECTION

(75) Inventors: Carl Smith, III, Osprey, FL (US);
Donald VanderSluis, Sarasota, FL (US);
Robert Fugerer, Lutz, FL (US)

(73) Assignee: Sunovia Energy Technologies, Inc., Sarasota, FL (US)

( * ) Notice: Subject to any disclaimer, the term of this patent is extended or adjusted under 35 U.S.C. 154(b) by 277 days.

(21) Appl. No.: 12/594,932

(22) PCT Filed: Apr. 7, 2008

(86) PCT No.: PCT/US2008/059596
§ 371 (c)(1), (2), (4) Date: Jan. 19, 2010

(87) PCT Pub. No.: WO2008/124701
PCT Pub. Date: Oct. 16, 2008

(65) Prior Publication Data
US 2010/0135000 A1   Jun. 3, 2010

Related U.S. Application Data

(60) Provisional application No. 60/910,554, filed on Apr. 6, 2007.

(51) Int. Cl.
*H05B 37/00* (2006.01)
(52) U.S. Cl. ............................................. 315/86; 307/64
(58) Field of Classification Search .................... 315/86, 315/136; 307/64, 65
See application file for complete search history.

(56) References Cited

U.S. PATENT DOCUMENTS

| | | | |
|---|---|---|---|
| 4,323,820 A * | 4/1982 | Teich | 315/86 |
| 5,331,353 A | 7/1994 | Levenson et al. | |
| 5,633,629 A | 5/1997 | Hochstein | |
| 5,924,784 A | 7/1999 | Chliwnyj et al. | |

(Continued)

FOREIGN PATENT DOCUMENTS
JP   2007005743   * 1/2007

OTHER PUBLICATIONS

International Searching Authority, "Written Opinion of the International Searching Authority and the International Search Report," Sep. 11, 2008.

*Primary Examiner* — Thuy Vinh Tran
(74) *Attorney, Agent, or Firm* — Holland & Hart LLP

(57) ABSTRACT

A light unit that includes an internal power supply that may be used in the event of an external power failure to provide power to the light unit. In one aspect, the present disclosure provides a lighting apparatus, comprising (a) a power input configured to receive external power from an external power source; (b) a solid state light element that is interconnected to the power input; (c) a detection circuit interconnected to the power input and that, when power is not provided to the power input, measures input impedance at the power input and determines if there is a lack of external power; and (d) a back-up power source that is interconnected to the solid state light element and the power input and that provides power to the solid state light element when the light element is; not provided with power from the power input.

10 Claims, 4 Drawing Sheets

U.S. PATENT DOCUMENTS

| | | |
|---|---|---|
| 6,573,746 B2 | 6/2003 | Kim et al. |
| 6,583,719 B2 | 6/2003 | Okada et al. |
| 6,628,083 B2 | 9/2003 | Pickering |
| 6,710,546 B2 | 3/2004 | Crenshaw |
| 6,900,595 B2 * | 5/2005 | Cojocary ............ 315/86 |
| 7,148,632 B2 | 12/2006 | Berman et al. |
| 7,638,948 B2 * | 12/2009 | Descarries et al. ........ 315/86 |
| 8,018,161 B2 * | 9/2011 | Smith et al. ............ 315/86 |
| 2002/0093360 A1 * | 7/2002 | Nagata ............ 324/765 |
| 2006/0006817 A1 | 1/2006 | Chason et al. |

\* cited by examiner

LIGHT UNIT WITH INTERNAL POWER FAILURE DETECTION

CROSS-REFERENCE TO RELATED APPLICATIONS

The present application claims priority from U.S. Provisional Patent Application No. 60/910,554, filed on Apr. 6, 2007, the entire disclosure of which is incorporated herein by reference.

FIELD

The present invention related to solid state lighting and, more particularly, to a solid state light unit that includes an internal power failure detection circuit and power supply that may illuminate the light in the event of a power failure.

BACKGROUND

Solid state lighting, such as Light Emitting Diode ("LED") light units, that may be inserted into electrical sockets, lamps, fixtures, and other electrical outlets are well known. These light units illuminate a dark area when there is electricity freely flowing to the light unit outlet and the light is turned on through a wall switch or other switching device. However, if there is a power outage, or if electricity stops flowing to the associated outlet for any reason, the light goes off and the area is no longer illuminated. In addition, the occurrence of black-outs, brown-outs, rolling black-outs and rolling brown-outs may cause inconvenience and generate safety concerns resultant from low or no lighting in certain areas.

SUMMARY

The present disclosure provides a light unit that includes an internal power supply that may be used in the event of an external power failure to provide power to the light unit. In one aspect, the present disclosure provides a lighting apparatus, comprising (a) a power input configured to receive external power from an external power source; (b) a solid state light element that is interconnected to the power input; (c) a detection circuit that tests input impedance when power is not being supplied to the power input and determines if the input impedance is indicative of a power loss; and (d) a back-up power source that is interconnected to the solid state light element and the power input and that provides power to the solid state light element when the detection circuit determines there is a power loss.

DETAILED DESCRIPTION

Figure 1:
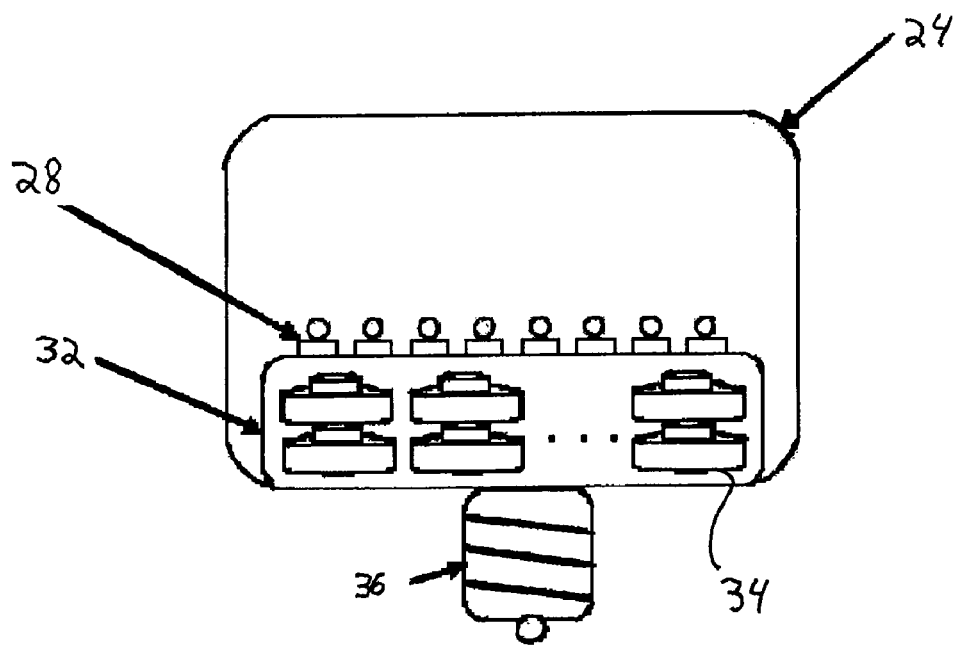
FIG. 1 is an illustration of a light unit of an embodiment of the present disclosure.

For a more complete understanding of this invention, reference is now made to the following detailed description of several exemplary embodiments as illustrated in the drawing figures, in which like numbers represent the same or similar elements. Various exemplary embodiments are described herein, with specific examples provided in many instances to serve to illustrate and discuss various concepts included in the present disclosure. The specific embodiments and examples provided are not necessarily to be construed as preferred or advantageous over other embodiments and/or examples.

Various embodiments provide a light unit that has an internal back-up power source, such as a battery, that is used to illuminate the light unit in the event of a loss of external power. The present disclosure recognizes that in the event of a power failure, it may be desirable to provide illumination to an area using a light unit that is compatible with common household light fixtures. Furthermore, the present disclosure recognizes that events other than a power failure may occur in which it may be desirable to power such an illumination device with internal power, such as during periods where load on a utility's power system is excessive. Various embodiments described herein provide a light unit that may be powered using an internal back-up power source in such situations.

In one exemplary embodiment, a light emitting diode (LED) light unit is adapted to fit into a conventional light socket or outlet, such as the common Edison-type light bulb outlet. The LED light unit includes LEDs that provide desired illumination, and may also include various other elements such as batteries, microprocessors, flexible and/or rigid Printed Circuit Boards ("PCBs"), heat sinks or heat dissipation technologies such as thermally conductive plastics, communications technologies such as wireless like the emerging IEEE 802.15.4 standards, and/or other component technologies. In such a manner, a LED light unit may, for example, switch to battery power when there is no power flowing to the outlet and provide illumination to an area during a power outage. Furthermore, in some embodiments, the LED light unit may be programmed, or instructed by received communications, to switch to battery power during peak electrical demand times, thus reducing the load on a utility (electrical) grid. In still other embodiments, the onboard communications, LEDs, micro-battery backup and micro-machines enable an LED light unit that projects graphic information and/or text for a host of advertising applications.

Referring to FIG. 1, a LED light unit 20 of an exemplary embodiment is illustrated. In this embodiment, all components necessary for operation of the unit are located inside of the unit apparatus as illustrated in FIG. 1. In this embodiment, the LED light unit 20 includes a housing 24, that is formed of a transparent material such as clear plastic, although such a housing 24 may be made from numerous types of materials and may be frosted or colored, and may contain reflectors and/or lenses for providing directivity of the light from the light unit 20. Located within the housing 24 are one or more LED elements 28, also referred to herein as an array of LEDs 28. The LED elements 28 may include any suitable type of LED, and in one embodiment are high intensity white LEDs. However, as will be understood by one of skill in the art, other types of LEDs may be utilized depending upon the desired illumination. Furthermore, a light unit may include other types of solid state lighting elements, such as organic light emitting diodes (OLEDs) and/or polymer light emitting diodes. Also included in the housing 24 is a circuit board 32 that includes electronic components to operate the LED elements 28. Also included with the circuit board 32, in the embodiment of FIG. 1, are batteries 34. The LED light unit 20 of FIG. 1 has a base 36 that is adapted to screw into conventional Edison-type sockets.

The component technologies within the LED light unit 20 are programmed, in an exemplary embodiment, to recognize when to switch to battery power. For instance, the LED light unit 20 with battery back-up may recognize and switch to battery power (and illuminate or remain illuminated) when there is a power outage. The LED light unit 20 may also recognize and switch to battery power (and illuminate or remain illuminated) when the public utility electrical grid is at peak usage periods, and it may switch to battery power during other various situations and times. In one embodiment, the LIED light unit 20 includes a communications component on the circuit board 32 that operates to receive communications from an external entity, and change the illumination state, or power source for the LED light unit 20. The communications component may receive wireless communications, or may receive communications from the power incoming to the unit. In addition, the utility (electrical) company may recognize a critical spike in electrical usage that could potentially lead to a dangerous power-loss situation, and the utility company could dispatch a signal that is recognized by the components within the light units 20 during such a critical situation which instructs all of the installed light units with battery back-up and communications capabilities within the utility company's service zone to switch to battery back-up. In such a manner, the load on the electrical utility may be decreased.

Although illustrated in FIG. 1 as a typical screw-in light bulb form, numerous other formats may be used in light units of various different embodiments, such as, for example, flood lights, LED globe lights, LED tube lights, etc., where at least one LED is present within the light enclosure and the light unit is adapted to be installed in a conventional manner to the appropriate power outlet or receptacle. As illustrated in FIG. 1, the electronic components, such as a microprocessor, batteries, PCBs, and other electrical components and circuitry are located within the light unit 20. In one embodiment, various electronic components are located within the base 36, and are separated from the bulb section (where the array of LEDs 28 are located) by a heat dissipation element. The heat dissipation element separates the array of LEDs 28 from the component technologies, and includes heat conductive materials and dissipation components that protect the heat-sensitive component technologies within the base 36 of the light unit 20 from the heat that may be generated by the array of LEDs 28. The array of LEDs 28 may be all of one color or of different colors and may be arranged in such a way inside of the unit whereby they one or more individual LED elements are selectively illuminated to spell a word or create a design. Individual LED elements in the array of LEDs 28 may be lit in a sequence to provide an eye-catching display.

Figure 2:
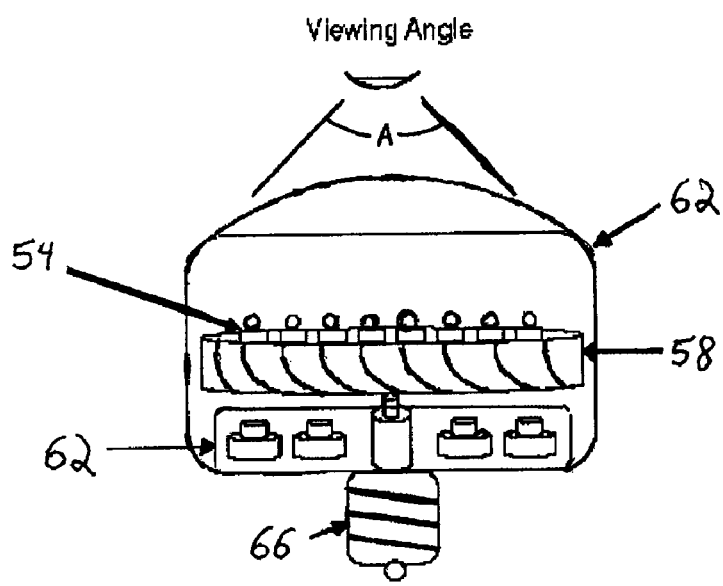
FIG. 2 is an illustration of a light unit of an embodiment of the present disclosure.

While illustrated and described with respect to light emitting diodes, other types of light elements may be used. Additionally, in another exemplary embodiment illustrated in FIG. 2, a LED light unit 50 includes an array of LEDs 54 that are mounted on a rotating disk 58 within housing 62. Such a rotating disk 58 may be manufactured using a micro-machined motor assembly. Such a configuration creates a cooling effect, and may also be used to generate multiple variable messages and eye-catching patterns by controlling the sequencing of the LEDs 54 as the disk 58 rotates. The LED light unit 50, also includes a circuit board, battery housing, and motor housing, designated generally as 62, and a base 66. Similarly as described above, various different configurations are possible for types and locations of various elements. The LED light unit 50 has a viewing angle A that may be selected to provide a desired field of view for the LEDs 54 within the unit.

Figure 3:
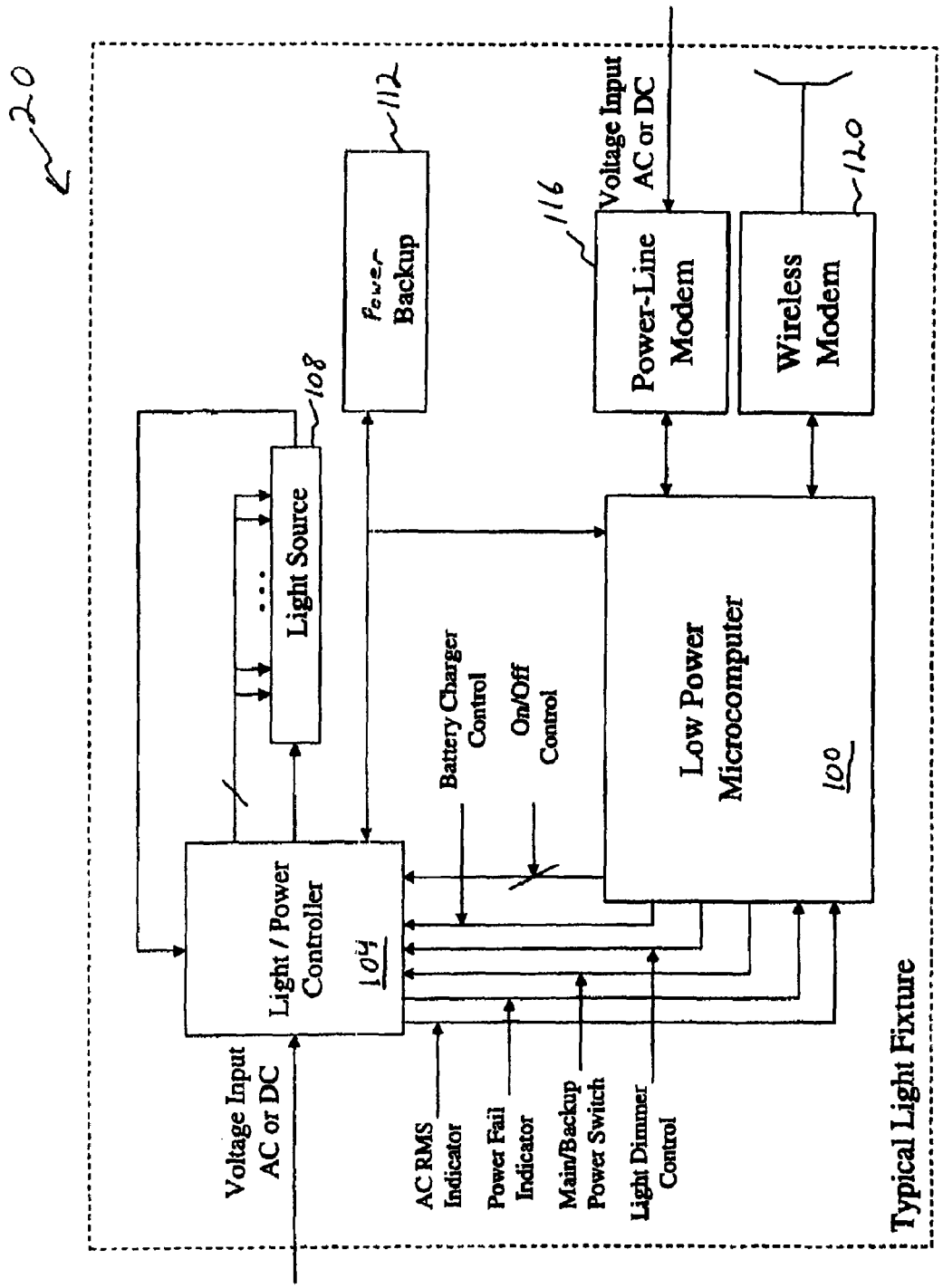
FIG. 3 is a block diagram illustration of the components of a light unit of an embodiment.

With reference now to FIG. 3, a top level functional block diagram of an LED light unit 20 is described for an exemplary embodiment. As described above, the components are included in a light unit that may be adapted to fit into traditional light sockets, thus providing a unit that may replace, for example, a traditional incandescent light bulb or a traditional fluorescent tube light. Included is a low power microcomputer 100 or microprocessor, a light/power controller 104, a light source 108 that, in an embodiment includes one or more LEDs, a backup power source 112, and communications portions that in this example include a power-line modem 116 and a wireless modern 120. The microcontroller 100 or microprocessor may include any suitable device and also may include memory that stores operating instructions or programming for the light unit 20. The light/power controller may provide power to the light source 108, and to individual elements in the light source 108, through a parallel or serial power connection. It will be understood that other embodiments may include one or both of a power-line modem 116 and a wireless modem 120. The light/power controller 104 of this embodiment does a number of things under microprocessor 100 control, such as (1) converting incoming alternating current to direct current to power the light source 108; (2) detecting wall switch open/closed and providing an indication of the same to the microprocessor; (3) providing an alternating current signal level to the microprocessor; (4) switching between back-up DC power and AC to DC power; and (5) switching back-up power source charging voltage on/off. The light source 108 may be a series or parallel connected array of LEDs under microprocessor 100 control. The low power microcomputer 100, in an embodiment, receives messages from Zigbee or other wireless 120 and/or power-line 116 modems and executes light functions based on the received messages. The microcomputer 100, in various embodiments, also sends status messages over wireless modem 120. While both a power-line modem 116 and a wireless modem 120 are illustrated in FIG. 3, such a light unit 20 may include just one type of modem, or may also include just a receiver that receives incoming communications and provides such communications to the microcomputer.

The microcomputer 100 may also monitor the back-up power source 112 and control charging of the back-up power source 112 via the light/power controller 104. The back-up power source 112, in an embodiment, includes a micro-battery backup that includes a suitable battery or batteries. In one embodiment is an array of rechargeable batteries that maintain processor 100 power and power the light source 108 in the event that an external power source is either unavailable or not desired to be used. For example, battery power may be evoked if a message is received through the wireless 120 or power-line 116 modems. Also, if a power-failure is detected, such as when a wall switch is closed but no AC signal, or a weak AC signal, is received at the input to the light/power controller 104, then the battery may power the light unit 20. In one embodiment, if the wall switch is open, the light remains off unless the wireless 120 or power-line 116 modems receive a communications signal indicating otherwise. These modems could also receive communications to control if the light unit 20 is on/off and any effects on the light source 108 such as sequenced lighting of one or more LEDs within the light source 108.

In another embodiment, light units include a module that is capable of determining the intended state of the light unit based on test measurements taken from the electrical supply system through a switch, such as a common wall light switch, that controls the illumination state of the light unit. In such a manner, the light unit determines the desired state of the unit and discerns the difference between the switch being turning "ON" during a power outage with the switch being turned "OFF." In this embodiment, the light unit with built-in battery back-up determines if the switch is in the "OFF" position and no longer connected to the normal source of power. In other words, the light unit is intended to be off. The light unit also determines if the switch is in the "ON" position but power is no longer present. Namely, the light unit is intended to be "ON" but power is not supplied through the switch. In such a case, the light unit provides illumination when the light unit is desired to be on.

Figure 4:
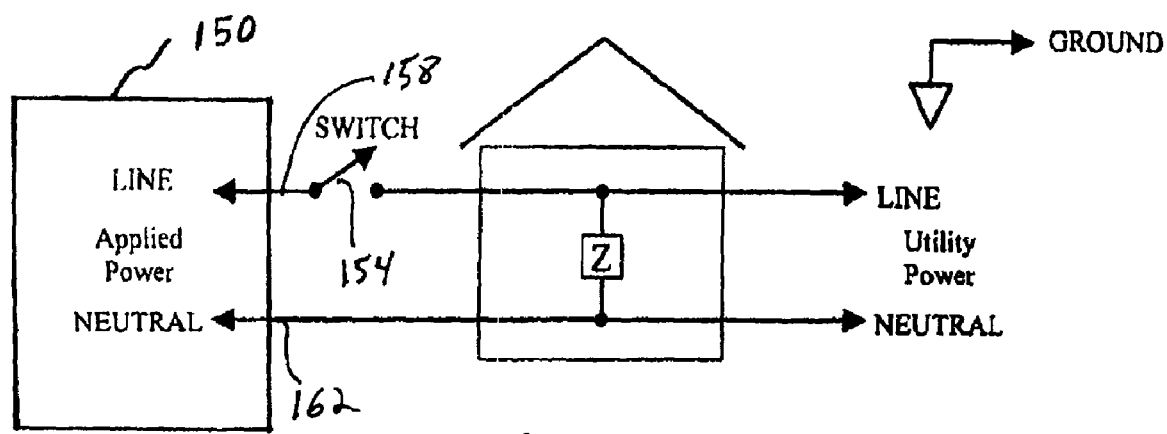
FIG. 4 is a block diagram illustration of an impedance measurement application of an embodiment.

With reference now to FIG. 4, a switch detection circuit of an embodiment is described. The switch detection circuit operates to determine if the switch is in the "ON" position and external power is not available, and activate the light elements within the light unit. The light unit is connected to utility power through a switch, and the desired illumination state of the light unit may be determined by the state of the switch. When the switch is "ON," the light unit should provide illumination regardless of the presence or absence of external power. Likewise, when the switch is "OFF," the light unit should not provide illumination. Thus, four different states are possible. First, no external power is present and the light unit is desired to be off. Second, no external power is present and the light unit is desired to be on. Third, external power is present and the light unit is desired to be off. Fourth, external power is present and the light unit is desired to be on. In the fourth state, the condition is singularly apparent to the light source by the presence of power at the light unit and no special discernment or detection method is required.

In the first through third states, in an embodiment, the light unit determines the desired state by measuring the line impedance presented to the light unit in the absence of utility power. The light unit of this embodiment is installed in a structure in a common manner. Typical structures, such as a residence, include common loads such as refrigerators, various other motor windings, transformer primaries, other illumination sources and various other loads. Each of these loads presents impedance to the utility supply voltage that, in the absence of such voltage, can be measured as one collective load. With reference to FIG. 4, the collective impedance may be modeled as an impedance Z. A light unit 150 is illustrated as connected to the collective impedance Z through a switch 154. When the switch 154 is open, an impedance as measured from the input terminals 158, 162 of the light unit 150 will effectively be infinite, as a result of the open circuit. Thus, if one or more components within the light unit 150 test the impedance present at the light unit input terminals 158, 162, the high impedance present when the switch 154 is open is indicative of the first and third states as described above. In such situations, the light unit 150 determines that the switch 154 is open and therefore that the light unit 150 should be off In the event that the switch 154 is closed and there is no external power present at the light unit 150 (the second state as described above), the impedance as measured from the input terminals 158, 162 of the light unit will be significantly less than the impedance presented by an open switch 154. Thus, the light unit 150 may measure the impedance present at the light unit input terminals 158, 162 and make a determination as to the desired state of light unit illumination.

Figure 5:
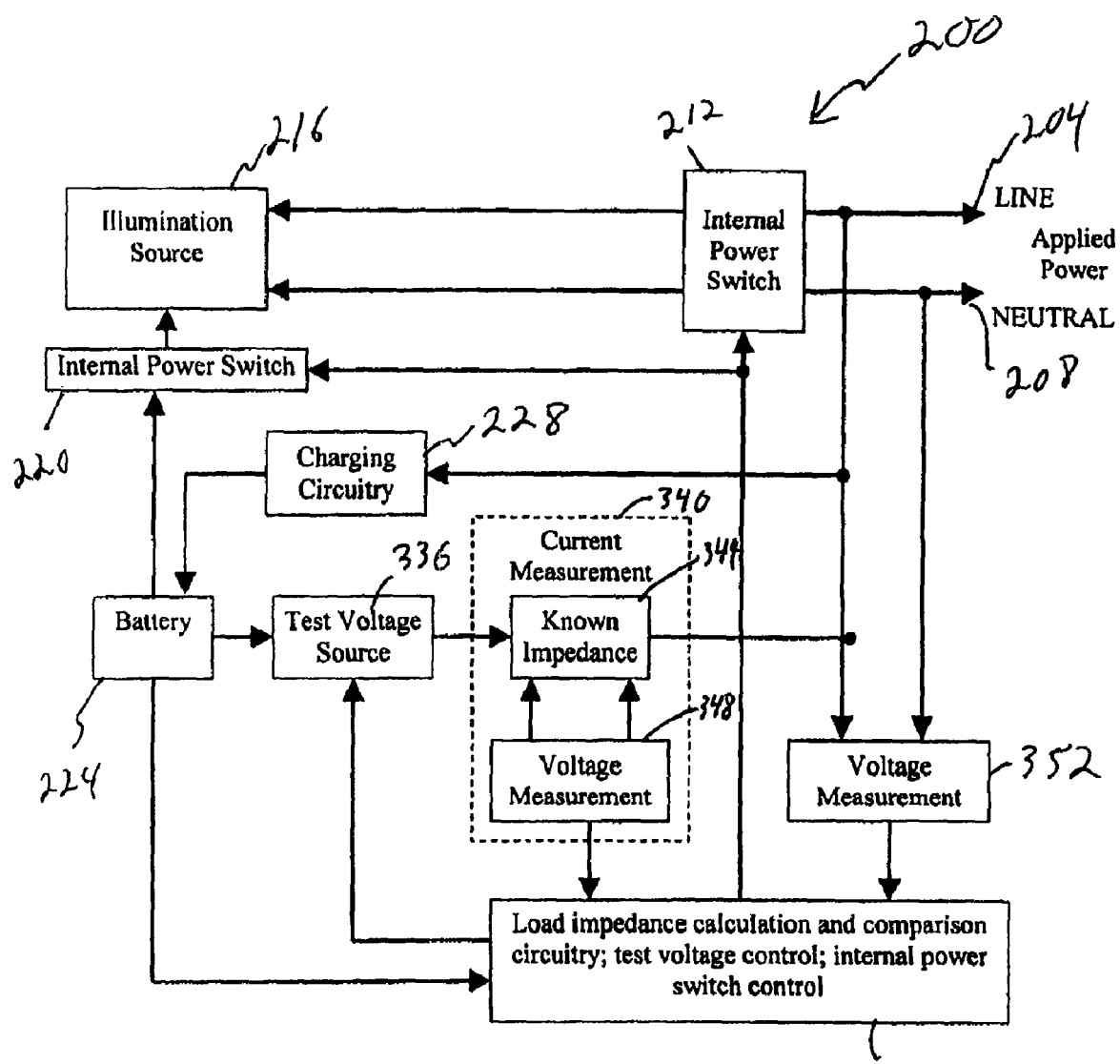
FIG. 5 is a block diagram illustration of the components of a light unit of another embodiment.

With reference now to FIG. 5, impedance measurement circuitry for a light unit 200 of an embodiment is now described. In this embodiment, the light unit 200 has a line input terminal 204 and a neutral input terminal 208. A first internal power switch 212 is connected to the input terminals 204, 208 and to an illumination source 216, such as an array of solid state lighting elements. A second internal power switch 220 is connected to the illumination source 216 and to an internal power supply illustrated in FIG. 5 as battery 224. The light unit 200, of this embodiment, includes a battery backup, although other types of internal power may be used in other embodiments. The battery 224 may be recharged through charging circuitry 228 that in interconnected with the input terminals 204, 208. The battery 224 is also interconnected to a control circuit 332 that, in this embodiment, provides load impedance calculation and comparison circuitry, test voltage control, and internal power switch control. A test voltage source 336 is controlled by the control circuit 332, and is connected to the battery 224 and to a current measurement circuit 340 that includes a known impedance 348 and a voltage measurement component 348. Finally, a second voltage measurement component 352 is interconnected between input terminals 204, 208, and the control circuit 332.

The light unit 200, as illustrated in FIG. 5, operates to make a determination as to the desired state of illumination of the light unit 200 and to the presence of applied power at the input terminals 204, 08. In this embodiment, impedance is measured by the application of a safe test voltage provided by test voltage source 336 through the known impedance 344 in series with the loads connected to the input terminals 204, 208 of the light unit 200. Voltage drop across the known impedance 344 is measured at voltage measurement component 348, indicating current through the collective load and is provided to control circuit 332. Voltage drop across the collective load is also measured at voltage measurement component 352 and provided to control circuit 332. These two measurements provide sufficient information for the control circuit 332 to calculate effective load impedance. The test voltage and duration of the period the test voltage is applied, and the frequency of the tests, are selected based upon the particular application in which the light unit 200 is to be used. If a pulse of sufficiently short duration is applied, capacitive impedance can be detected. Once load impedance is calculated, the value is compared to preset levels to determine whether a power outage has occurred and the switch is closed, as indicated by the appearance of a relatively low collective load impedance, or the switch is open as indicated by a very high load impedance. The light unit 200 is then switched to the appropriate state.

In one embodiment, if the light unit 200 determines that the switch is in the "ON" state, and no external power is present, the light unit 200 powers the illumination source 216 using the internal battery back-up 224. When powering the light unit 200 with battery back-up 224, the light unit 200 may be operated at a reduced lighting state in order to provide a safe amount of illumination and conserving power relative to the full power state of the light unit 200, and thereby increasing the amount of time that the light unit 200 may be operated using battery back-up alone. Alternatively, in some applications it may be determined that a reduced lighting state is not desirable, and the light unit 200 may operate at full capacity while operating on battery back-up. For example, a light unit 200 may be located in a facility that is equipped with a back-up power source, such as a generator, that is activated in the event of a power loss. In such a case, it may be desired to operate the light unit 200 at full power during the period of time that is required to bring the back-up power source online. Alternatively, a light unit 200 may be located in an area of a structure where light is important for safety reasons, such as a stairway. It may be desirable in such an application to operate the light unit 200 with a reduced output that is adequate to provide proper illumination of the area for an extended period of time. Such operation may be programmed into the control circuit 332 either prior to installation of the light unit 200, or through a system that is able to communicate with the light unit 200, such as described above. In still other embodiments, the light unit 200 may operate at full capacity for a predetermined time period, and then reduce output in order to extend the battery life. Such an embodiment may be used in residential applications where many power interruptions are relatively brief, lasting less than a few minutes. However, in the event that the power remains interrupted for longer than a few minutes, it is more likely that the power will remain interrupted for an extended period. In such a manner, the light unit 200 may provide full illumination for the initial time, and then reduce the illumination to conserve battery power and enhance the duration of time that the light unit 200 may be operated on battery power. The control circuit 332, in various embodiments, may include suitable components to perform the functions described, as will be readily understood buy one of skill in the art. In one embodiment, the control circuit 332 comprises a microcontroller that may be programmed to perform various tasks such as those described above. Such a microcontroller may be a custom manufactured part that operates to perform the various functions described above, and/or may include a memory that contains program information that, when executed by the microcontroller cause the microcontroller to perform the various functions as described.

In still further embodiments, whenever external power is not present at the light unit 200, the impedance at the input terminals 204, 208 is periodically measured to determine if there is a power interruption and the desired state of the light unit 200 is "ON". That is, the light unit 200 periodically determines if the current state of the unit is state two as described above. Such periodic measurements may be made, for example, every two seconds. Thus, assuming the battery back-up of the light unit 200 is charged, the maximum time that light will not be present when the desired state of the light unit is "ON" will be relatively short.

While the instant disclosure has been depicted, described, and is defined by reference to particular exemplary embodiments of the disclosure, such references do not imply a limitation on the disclosure, and no such limitation is to be inferred. The embodiments recited in this disclosure are capable of considerable modification, alteration, and equivalents in form and function, as will occur to those ordinarily skilled in the pertinent arts. The depicted and described embodiments are examples only, and are not exhaustive of the scope of the invention.

The foregoing disclosure sets forth various embodiments via the use of functional block diagrams and examples. It will be understood by those within the art that each block diagram component, operation and/or component described and/or illustrated herein may be implemented, individually and/or collectively, by a wide range of hardware, software, firmware, or any combination thereof. The foregoing disclosure also describes embodiments including components contained within other components (e.g., the various elements shown as components of a light unit). Such architectures are merely examples, and many other architectures can be implemented to achieve the same functionality.

What is claimed is:

1. A lighting apparatus, comprising:
    a power input configured to receive external power from an external power source
    a solid state light element that is interconnected to the power input;
    a detection circuit interconnected to the power input and that, when power is not provided to the power input, measures input impedance at the power input and determines if there is a lack of external power;
    a back-up power source that is interconnected to the solid state light element, the detection circuit, and the power input, that provides power to the solid state light element when the light element is not provided with power from the power input, and
    a microcontroller that is interconnected with the power input, solid state light element, and back-up power source, that controls the illumination of the solid state light element, wherein the microcontroller comprises a memory that has instructions stored therein that, when executed by the microcontroller, cause the microcontroller to illuminate the solid state light element using power from the power input or using power from the back-up power source.

2. The lighting apparatus, as claimed in claim 1, wherein the microcontroller comprises a memory that has instructions stored therein that, when executed by the microcontroller, cause the microcontroller to charge the back-up power source using power from the power input.

3. The lighting apparatus, as claimed in claim 1, wherein the microcontroller comprises a memory that has instructions stored therein that, when executed by the microcontroller, cause the microcontroller to test impedance at the power input and determine if there is a lack of external power.

4. The lighting apparatus, as claimed in claim 1, further comprising:
    a modem that is interconnected with the microcontroller and that receives signals from a source external to the lighting apparatus, the microcontroller controlling the illumination of the light element in response to the received signals.

5. The lighting apparatus, as claimed in claim 4, wherein the modem comprises a power-line modem that receives signals that are modulated on the power signal from the external power source.

6. The lighting apparatus, as claimed in claim 4, wherein the modem comprises a wireless modem that receives signals from a wireless transmitter that is remote from the lighting apparatus.

7. The lighting apparatus, as claimed in claim 1, wherein the back-up power source comprises a battery.

8. The lighting apparatus, as claimed in claim 1, wherein the solid state light element comprises a light emitting diode.

9. The lighting apparatus, as claimed in claim 1, wherein the detection circuit comprises:
    a test voltage source;
    a known impedance that is interconnected to the test voltage source and to the power input;
    a first voltage measurement circuit that measures a first voltage across the known impedance when the test voltage source applies a voltage to the known impedance;
    a second voltage measurement circuit that measures a second voltage across the power input when the test voltage source applies a voltage to the known impedance; and
    a comparison circuit that compares the voltage measurements.

10. The lighting apparatus, as claimed in claim 9, wherein when the comparison circuit is operable to determine a load impedance based on the test voltage, known impedance, and first and second voltage measurements.

* * * * *